INVENTOR.
THOMAS F. HELMS

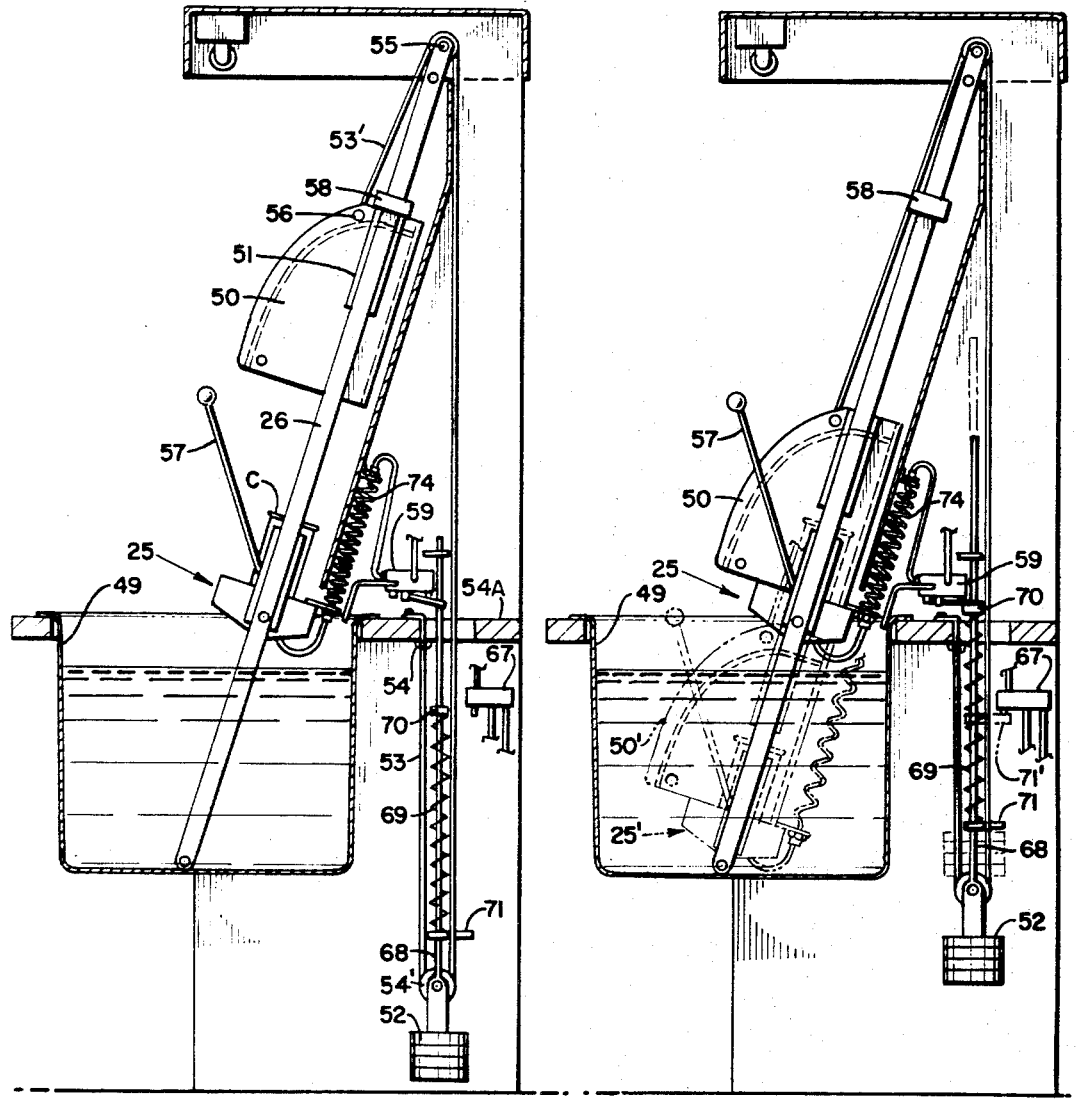

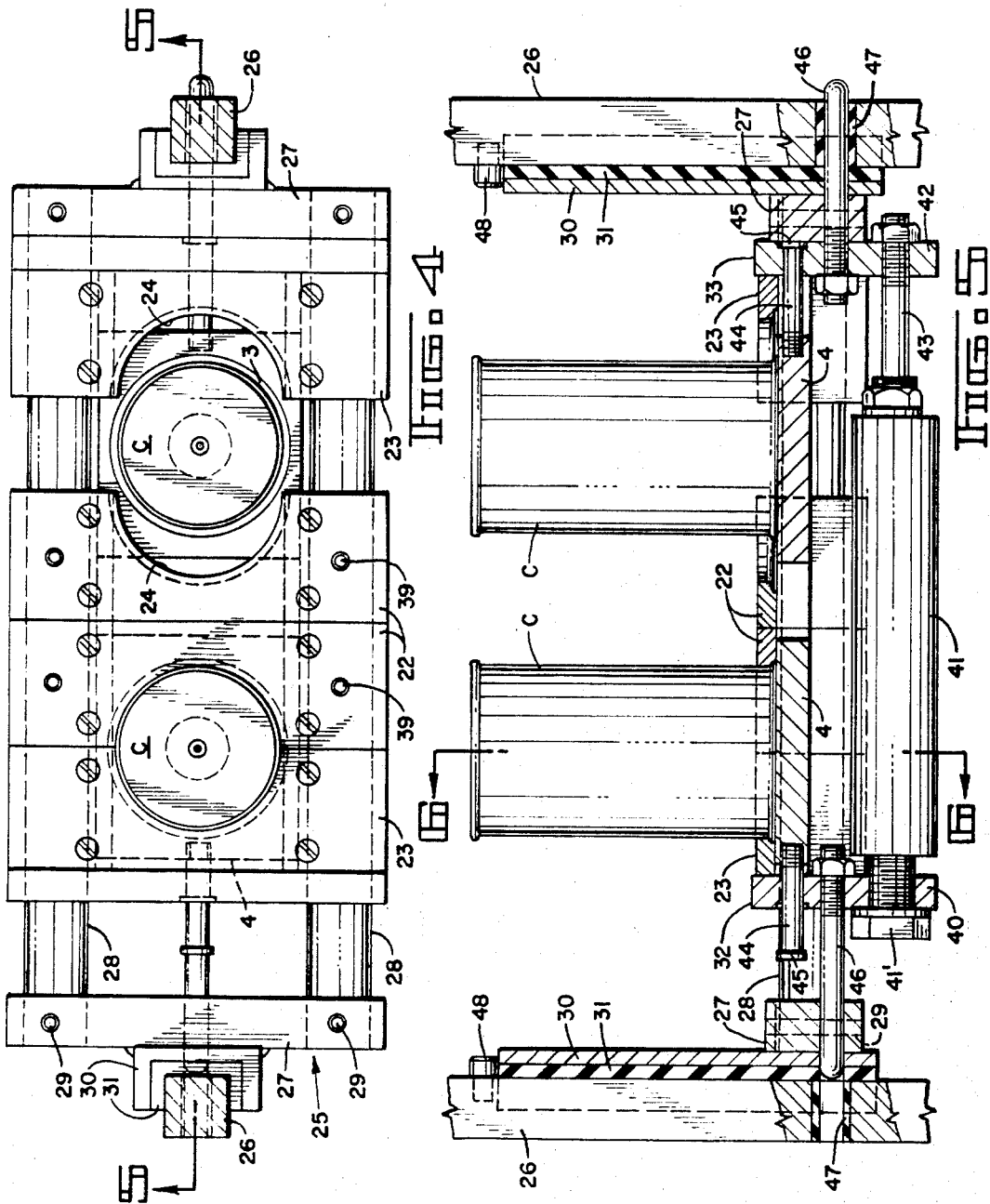

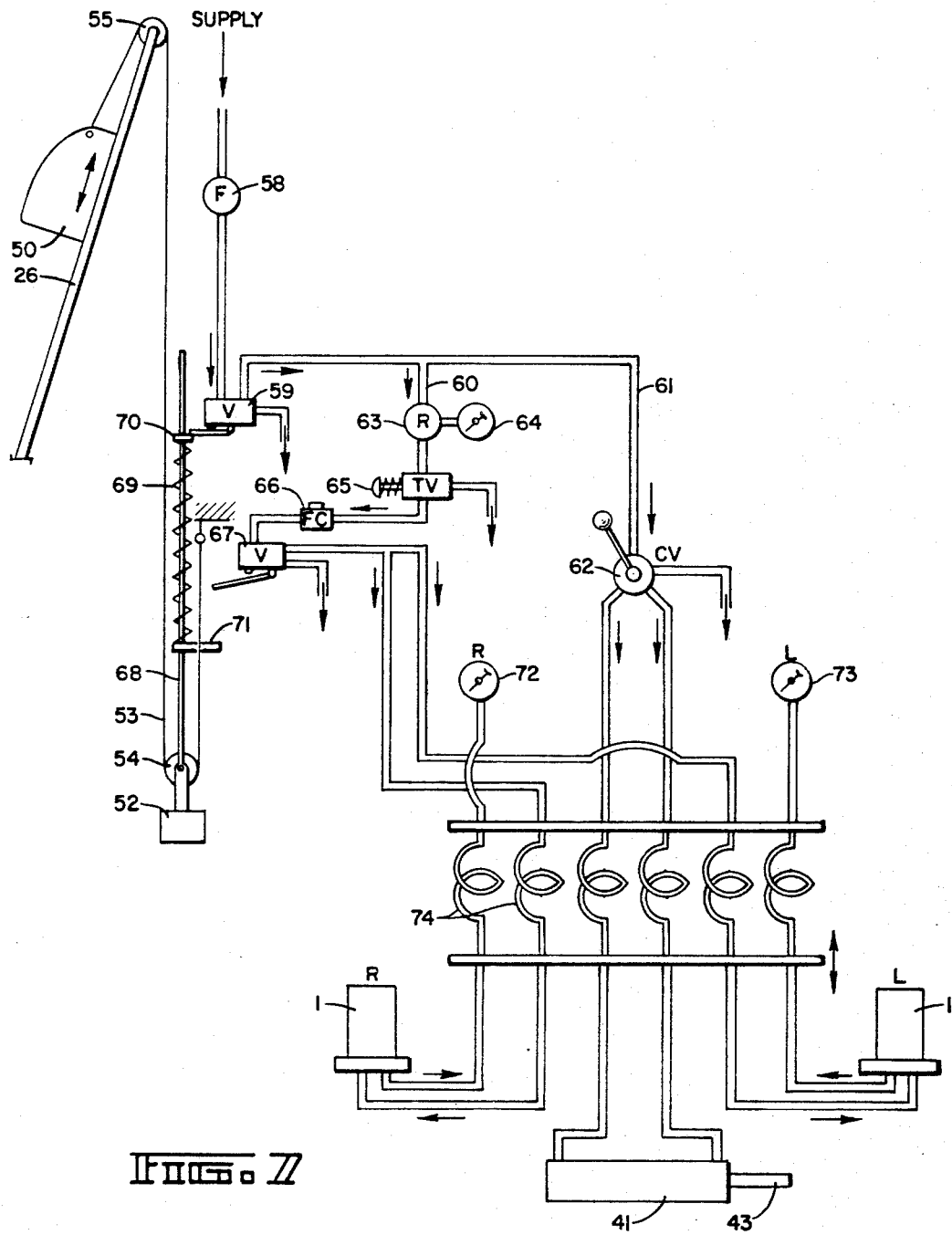

United States Patent Office 3,418,845
Patented Dec. 31, 1968

3,418,845
CAN BODY TESTING MACHINE
Thomas F. Helms, New Fairfield, Conn., assignor to Idex
Corporation, a corporation of Connecticut
Filed June 21, 1966, Ser. No. 559,297
9 Claims. (Cl. 73—45.5)

ABSTRACT OF THE DISCLOSURE

This specification discloses a machine for placing a testing fluid pressure on the interior of can bodies prior to the time that such can bodies have their final lid placed ber that extends into the can body, and a sealing arrangement thereon. There is disclosed a specific form of plug member whereby the test fluid pressure within the can body is sealed within the can at the sides thereof near the opening end.

There is also disclosed a fluid pressurizing system involving interlocks so as to place fluid pressure on the cans to be tested only when the cans are submerged in a tank of water whereby the leakage or buckling of the can may be visually checked in safety.

---

The invention relates to machines for determining the pressure tightness or leakproof quality of can bodies, including the side seams and end beads as well as the tightness of "easy opening" can ends such as those having tear tabs or strips which can be pulled free to create pouring openings or to sever the end for removal from the can body.

In the pressure testing of can bodies having one end open and the other closed and having an outwardly extending flange at the open end, it has been difficult to work out a satisfactory way of obtaining a pressure-tight seal at the open end and still provide for easy and rapid mounting and removal of the can bodies. The problem of doing so has been complicated further by the need to provide a sealing and clamping arrangement which is adaptable to alternate submersion in a test tank, requiring the invention of seals and clamps of such simplicity and compactness as to be capable of mounting on a movable carriage for submersion and testing in a safe manner.

SUMMARY

According to my invention, the testing machine comprises a plug member which extends into a can body and has a sealing engagement with the open end of the can. In one important aspect of my invention, this plug extends so as to occupy substantially the full interior space within the can, leaving only a slight clearance for distribution of compressed fluid for testing the can. Clamping members engage the outside of the can body in the region of its sealing engagement with the plug member, being shaped to fit the can body. Such clamping members comprise two pairs of clamping elements each having a semicircular clamping surface, the elements of each pair being separable to allow mounting and removal of the can bodies. Passages in the plug member carry compressed fluid to and from the clearance spaces between such member and the interior of the can body. The plug member has a base against which bears the outwardly extending flange at the open end of the can body. The clamping members, besides being shaped to fit the outside of the can body are also shaped to engage such flange and to clamp the flange against the base.

According to another aspect of my invention as applied to the simultaneous testing of two can bodies, a "centering" system is used in an arrangement which includes two plug members and two pairs of separable clamping elements. There is a fixed mounting for one clamping element of each pair, the other clamping element being movable and the two plug members also being movable. A lost motion coupling is provided between the movable clamping elements and the plug members whereby movement of the clamping elements to a predetermined extent causes movement of the plug members to a lesser extent. The arrangement further includes fluid pressure means for actuating the movable clamping elements. By reason of the lost motion connection between the plugs and clamps as used in conjunction with the other construction described, actuation of the fluid pressure means will produce separation of the clamping elements of each pair and also move the plug members to a central location between the separated elements to permit mounting and removal of can bodies without interference between the flanges of the cans and the clamps.

In another aspect of my invention, the plug members and clamps are mounted on a carriage which is movable up and down along guide rails for alternate submersion of the can bodies to be tested below the surface of a liquid. Interlock fingers connected to the clamps provide locking engagement with the guide rails when the clamping members are released with the result that actuation of the fluid pressure means to release the clamping action will also lock the carriage in a predetermined position. The fluid pressure system includes a valve controlling admission of compressed fluid to the interior of the cans, a system valve and an auxiliary valve both in series with the first-named valve. Cooperating with the system valve, is a transparent shield which can be moved into a position between the cans and the operator of the machine. This shield is movable independently of the carriage movement; also during part of its travel it is movable with the carriage. Means operable by the independent movement of the shield opens the system valve when the shield is lowered to the limit of its independent movement. Other means operable by the movement of the carriage opens the auxiliary valve upon submersion of the can bodies. The effect of pressure on the cans to be tested is seen by the operator through the transparent shield to visually determine whether there are leaking bubbles or can buckling. Thus the entire fluid pressure system is safety-interlocked with the several operating elements of the machine so as to progressively open a series of safety valves as the several steps of the operation are carried out.

Other features and advantages of the invention will appear in the description which follows.

Description

With refernce to the accompanying drawings, I shall now describe the best mode contemplated by me for carrying out my invention.

FIG. 2 is a vertical cross sectional view taken on line 2—2 of FIG. 1.

FIG. 3 is a view similar to FIG. 2 but with the parts shown in another position.

FIG. 4 is a top plan view of the clamping and centering arrangement.

FIG. 5 is a vertical longitudinal sectional view taken on line 5—5 of FIG. 4.

FIG. 7 is a diagram of the fluid pressure system.

Sealing, displacement and clamping mechanism

Figure 6:
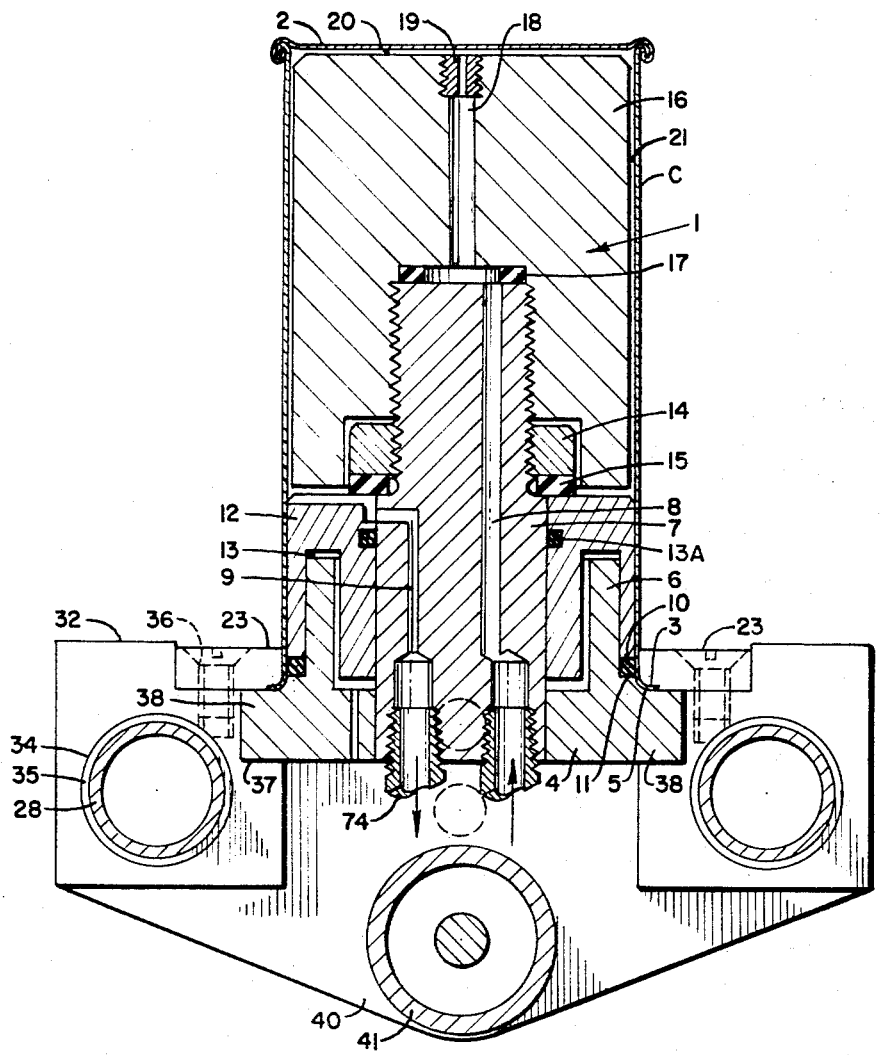
FIG. 6 is an enlarged vertical cross-sectional view taken on line 6—6 of FIG. 5.

Referring to FIG. 6 I shall first describe the general construction of my sealing and clamping arrangement which comprises a plug member indicated generally at 1 adapted to extend into a can body C having one end open and the other closed, as by the end 2, and an outwardly extending flange 3 at the open end of the can body. Plug member 1 preferably is constructed as follows: A base 4 provides a bearing 5 for the outwardly extending flange 3 of the can. Extending upwardly from base 4 is an annular flange 6. Also extending upwardly from base 4 is a stud bolt 7 in which is formed inlet passage 8 and outlet passage 9. A seal, such as comprised by the O-ring 10, fits over the annular flange 6 and rests against a shoulder 11 slightly above the bearing 5 so that the seal will bear against the inside of the can body at a point inwardly of the radius of the end flange 3 of the can. A seal compressor 12 has an annular recess 13 to receive flange 6 of the base of the plug. A seal, such as provided by the O-ring 13A, is received in an annular recess of compressor 12, sealing compressor 12 at the point where it surrounds the stud bolt 7. A collar 14 has threaded engagement with stud bolt 7, and when screwed down against sealing washer 15 will compress the seal 10 between the end of compressor 12 and shoulder 11 of the base.

An upper plug member 16 has threaded engagement with stud bolt 7, and is sealed to the end thereof as by a resilient washer 17. Member 16 is interchangeable with similar members of different lengths so as to adapt the apparatus for testing cans of various heights. A bore 18 in member 16 furnishes a channel of communication between the upper end of passage 8 and the inside of end 2 of the can body. If desired a threaded orifice member 19 may be provided to restrict the size of the channel for the high pressure fluid entering the can. Notice that the member 1 extends so as to occupy substantially the full interior space within the can, leaving only a slight clearance 20, 21 for distribution of compressed fluid for testing the can.

Clamping members 22, 23, FIG. 4, are shaped to fit the outside of the can body adjacent its open end. This engagement, FIG. 6, is in the region of seal 10 so that the clamping members hold the can body tightly in the sealing region and lock it against endwise movement.

*Centering mechanism*

In the preferred construction shown there are two plug members 16 and the clamping members comprise two pairs of clamping elements 22, 23, each having a semicircular clamping surface 24, the elements of each pair being separable, as shown at the right hand of FIG. 4, to allow the mounting and removal of can bodies without interference between flange 3 and the clamps. The clamping elements 22, 23 and plug members 16 are mounted on a carriage 25, FIGS. 2 and 5, movable up and down along guide rails 26. The frame of the carriage consists of end plates 27 joined by a pair of rods or tubes 28 fixed in openings in the end plates as by means of screws 29. Channel-shaped guides 30 are fixed to end plates 27 as by welding, and may be provided with nylon linings 31 engaging the rails 26. Outer clamp and plates 32, 33 are apertured at 34, FIG. 6, to receive nylon bushings 35 which have sliding engagement with tubes 28. Outer clamps 23 are fastened to extensions of end plates 32, 33 as by means of screws 36. The end plates are recessed at 37, and these recesses, in conjunction with outer clamps 23 form channel-shaped guides within which the edges 38 of the bases 4 of plug members 1 are received for sliding movement parallel to the movement of outer clamps 23 along the tubes 28. Inner clamps 22 are fixed to tubes 28 as by means of set screws 39, FIG. 4.

Outer clamp end plate 32 has a downwardly extending portion 40 to which is fastened, as by a screw 41', the cylinder 41 of fluid pressure means for moving the movable clamping elements 23. The other outer clamp end plate 33 has a similar downwardly extending portion 42 to which is fastened by a rod 43 the piston (not shown) of the fluid pressure means, such piston having the usual sliding engagement with its cylinder 41 so that when pressure fluid is admitted to the cylinder the outer clamp end plates (and with them the outer clamps 23 fixed to such plates) will be moved outwardly to open the clamps. In FIG. 4 this action has already separated the right hand pair of clamping elements, and further extension of the fluid pressure device 41, 43 will produce a similar separation of the left hand pair of clamping elements.

Now we come more particularly to the centering part of the mechanism in which there is used a lost motion coupling 44, FIG. 5, between each of the movable clamping elements and the plug members 1. This coupling as shown consists of a pair of adjustable centering rods 44 threaded into the bases 4 of the plug members and having heads 45 engageable with the outside of outer end plate members 32, 33, respectively. Notice that at the right hand end of FIG. 5, head 45 of the centering rod is clamped between the base of a recess in plate 33 and end plate 27 of the carriage. This fixes the position of the plug member so that upon proper adjustment of centering rod 44 the plug member will be centered between the opened clamping elements 22, 23. Thus movement of the clamping elements 23 to a predetermined extent causes movement of plug members 1 to a lesser extent (normally one-half of the movement of elements 23). The result is that actuation of the fluid pressure means 41, 43 will produce separation of the clamps and also will move the plug members 1 to a central location between the clamping elements to permit mounting and removal of can bodies having an outwardly extending flange 3 without interference between such flange and the clamping elements.

*Carriage interlock*

Carriage interlock fingers 46 fixed to the outer clamp end plates 32, 33 as by the threaded connections shown are aligned with openings 47 in guide rails 26 when the carriage 25 is in its uppermost position as determined by stops 48 against which the upper ends of guides 30 bear when the carriage is in such position. When the can clamps are closed, left hand of FIG. 5, finger 46 will be drawn clear of the opening 47; when closed, right hand of FIG. 5, finger 46 will be engaged in opening 47. Thus upon completion of actuation of the fluid pressure means to open the clamps both fingers 46 will be engaged with the guide rails, locking carriage 25 against downward movement. Conversely, upon completion of actuation of the fluid pressure means to close the clamps, both fingers 46 will be drawn clear of their locking engagement with the rails, freeing the carriage 25 for downward movement from the full line position shown in FIG. 3 to the position shown in dot-dash lines at 25' in that view in which the can bodies are submerged for testing in liquid contained in a tank 49. When the carriage is lowered, interlock fingers 46 ride inside the rails 26 and prevent unclamping of elements 22, 23. Thus any loss of fluid pressure in cylinder 41 during test, or bursting of hoses, or even accidental operation of clamp valve 62 cannot allow the cans to be released in any carriage position save that shown in FIG. 2 where both the system valve 59 and safety valve 67 are open and form a pressure-relieving system for the test chambers, exhausting any pressure in them back to the pressure source. The operation of valves 59, 62 and 67 will be explained in more detail hereinafter.

The interlock fingers 46 do two jobs:

(1) Prevent lowering of carriage 25 until guard 60 is in place and clamps 22, 23 fully closed (which cannot be accomplished with the guard out of position), (2) Prevent release of clamping in any position save that shown in FIG. 2 where no pressure can exist within the cans.

The carriage is counterweighted in a manner similar to that which will be described with reference to counterweighting of the shield which covers the can bodies during clamping and testing.

Figure 1:
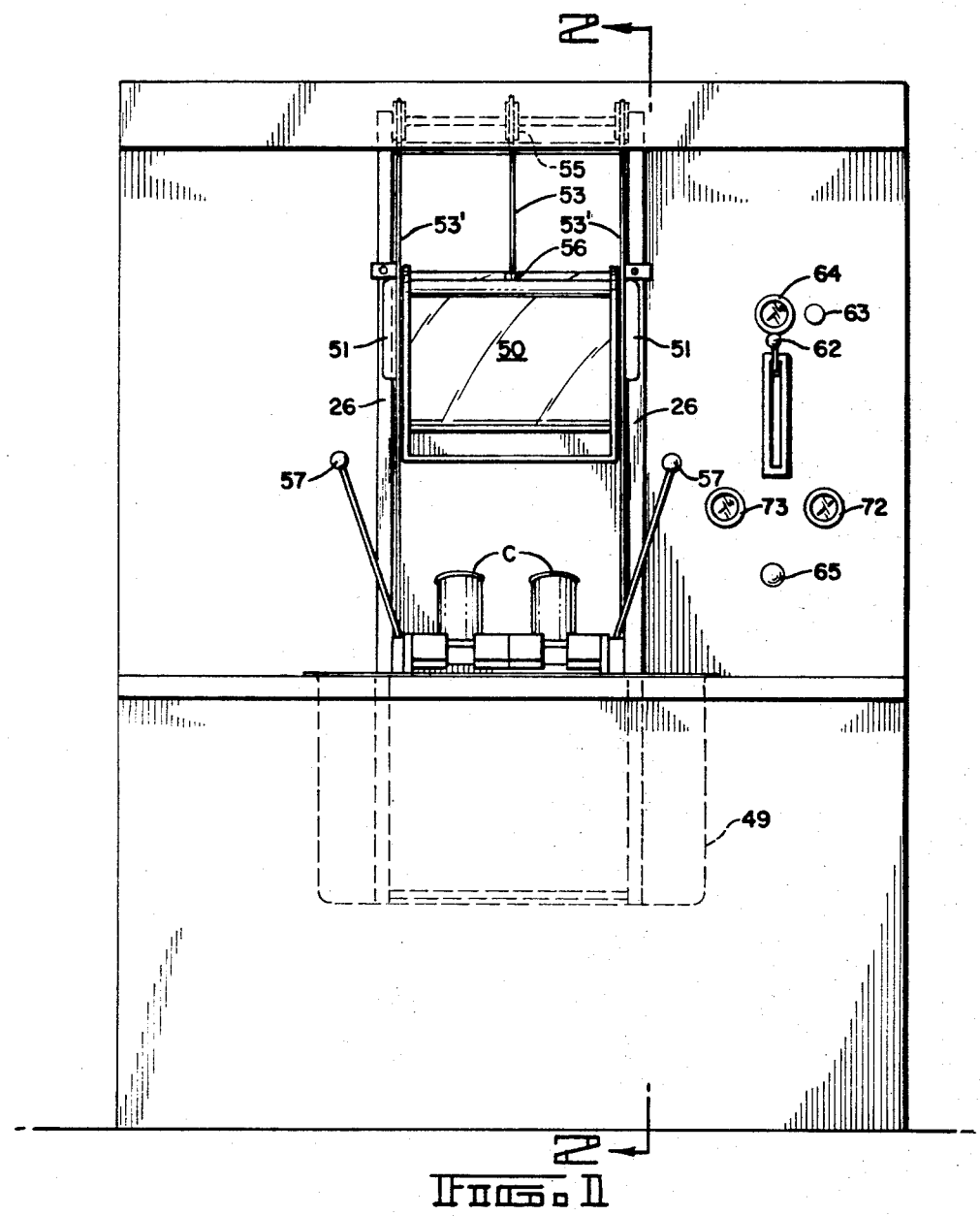
FIG. 1 is a front elevational view of a testing machine embodying my invention.

A transparent shield 50 provided with channel-shaped guides 51 engaging guide rails 26, moves up and down along the guide rails independently of the movement of the carriage 25. Also during part of the travel of the shield it is movable with the carriage. The shield is counterweighted as by means of a balancing weight 52 operating in conjunction with a wire cable 53 anchored at 54 to the table 54A. Cable 53 passes over a sheave 54' attached to the weight 52 and thence over a sheave 55 at the upper end of the machine to the point 56 where it is connected to the shield 50. The cables 53' of a similar counterweighting system for the carriage 25 can be seen in FIG. 1, and suitable handles 57 may be provided for manual operation of the carriage.

*Interlocked fluid pressure system*

The fluid pressure system is shown diagrammatically in FIG. 7. Fluid under pressure from a suitable supply source passes through the filter 58, thence through a system valve 59 and into parallel pressure lines 60 and 61. Line 60 carries the pressure which is to test the can bodies and line 61 the pressure which is used to operate the clamping elements. A clamp valve 62 in line 61 controls the introduction of fluid pressure to the cylinder 41 which operates the clamping elements 22, 23. Fluid pressure in line 60 is controlled by a regulator valve 63 which is adjusted to the desired pressure as indicated by a gauge 64. A test valve 65 is operated manually at the times when it is desired to test a pair of can bodies. Beyond test valve 65 is a flow control valve 66 and beyond this an auxiliary safety valve 67.

It will be observed that the system valve 59 and the auxiliary valve 67 are in series with the test valve 65 with the result that the operation of the test valve is effective only when the shield 50 and carriage 25 are in the desired positions for operation of the clamping elements and testing of the can bodies. When the shield 50 is in the position shown in FIG. 2, system valve 59 is closed and the pressure fluid is prevented from reaching the clamp operating cylinder 41. However, after the can bodies to be tested have been placed in position for clamping and the shield 50 has been lowered into the position shown in full lines in FIG. 3, the action of lowering the shield will raise a rod 68 extending upwardly from counterweight 52 and carrying an actuator 70 resting on the top of a spring 69 into the position shown in FIGS. 3 and 7 where it opens the system valve 59. With the system valve open, actuation of the clamp valve 62 will result in clamping the cans in test position. After clamping, shield 50, together with the carriage 25, is moved down into the position shown in dot-dash lines in FIG. 3 at 50' and 25'. This further lowering of the shield 50 compresses spring 69 and actuating finger 71 is carried from the position shown in full lines in FIGS 3 and 7 into the position shown in dot-dash lines at 71' in FIG. 3, opening the auxiliary valve 67. Now, with both the system valve 59 and the auxiliary valve 67 open, manual actuation of test valve 65 will be operative to introduce the high pressure fluid into the passages in plug members 1 through which the fluid reaches the interior of the can bodies. The test pressure is read on the gauges 72 and 73 and should correspond to the pressure shown on gauge 64 at the regulator valve 63. The effect of the testing pressure on the can is then observed visually through the transparent shield 50.

In order to allow the movements of the shield 50 and carriage 25 as described, the several pressure lines are provided with flexible hose sections such as shown at 74 in FIG. 7 which may conveniently be made of spring coiled nylon tubing.

From the foregoing description of my interlocked pressure system it will be discerned that my machine includes a carriage which is movable up and down along guide rails for alternate submersion of the can bodies to be tested below the surface of a liquid, a valve 65 controlling admission of compressed fluid to the passages in the plug members which extend into the cans, a system valve 59 and an auxiliary valve 67, both in series with the first-named valve, means 68, 70 operable by the independent movement of the shield 50 to open the system valve 59 when the shield is lowered to the limit of its independent movement, i.e., into the position shown in full lines in FIG. 3, and means 68, 71 operable by movement of the carriage 25 from the full line position of FIG. 3 into the position shown in dot-dash lines at 25' in that view to open the auxiliary valve 67 upon submersion of the can bodies.

The terms and expressions which I have employed are used in a descriptive and not a limiting sense, and I have no intention of excluding equivalents of the invention described and claimed.

I claim:
1. A can body testing machine comprising
    (a) a member adapted to extend into a can body having one end open and the other closed, said member having a resilient sealing means to engage the inner sides of the can within the open end thereof and extending so as to occupy substantially the full interior space within the can, leaving only a slight clearance for distribution of compressed fluid for testing the can,
    (b) clamping members shaped to fit the outside of the can body adjacent its open end in the region of the aforesaid sealing means to hold the can body tightly in the sealing region and lock it against endwise movement, and
    (c) passages in said member referred to in (a) above for introduction and removal of compressed fluid to and from the clearance spaces between said member and the interior of the can body.

2. A can body testing machine according to claim 1 in which member (a) has a base shaped to conform to said open end can end and providing a bearing for an outwardly extending flange at the open end of the can body, and the clamping members (b) are shaped to engage said flange and to clamp the flange against said base.

3. A can body testing machine according to claim 1 which includes a second member (a) and in which members (b) comprise two pairs of clamping elements each having a semicircular clamping surface, the elements of each pair being separable to allow the mounting and removal of can bodies over and from the respective members (a) and within and from the members (b), and which further includes
    (d) a fixed mounting for one clamping element of each pair, the other clamping element of each pair being movable and the two members (a) also being movable, and
    (e) fluid pressure means for moving the movable clamping elements and a lost motion coupling between such elements and the members (a) whereby movement of the clamping elements to a predetermined extent causes movement of the members (a) to a lesser extent,
by virtue of all of which, actuation of the fluid pressure means will produce the aforesaid separation of the clamping elements of each pair and also move the members (a) to a central location between the separated elements to permit mounting and removal of can bodies having an outwardly extending flange at the open end thereof without interference between such flange and the clamping elements.

4. A can body testing machine according to claim 1 which includes a carriage on which members (a) and (b) are mounted, said carriage being movable up and down along guide rails for alternate submersion of the can bodies to be tested below the surface of a liquid, fluid pressure means for actuating the clamping members (b), and interlock fingers connected to the clamping members for locking engagement with the guide rails when the clamping members are released whereby actuation of the fluid pressure means to release the clamping action will lock the carriage in a predetermined position and reverse actuation of the fluid pressure means to produce clamping action will withdraw the interlock fingers from said locking engagement and permit lowering of the carriage to submerge the can bodies for testing.

5. A can body testing machine according to claim 1 which includes a carriage on which members (a) and (b) are mounted, said carriage being movable up and down along guide rails for alternate submersion of the can bodies to be tested below the surface of a liquid, a valve controlling admission of compressed fluid to the passages in member (a) and an auxiliary valve in series with the first-named valve, means operable by the aforesaid movement of the carriage to open the auxiliary valve upon submersion of the can bodies and to close the auxiliary valve upon raising of the carriage for submersion.

6. A can body testing machine according to claim 1 which includes a carriage on which members (a) and (b) are mounted, said carriage being movable up and down along guide rails for alternate submersion of the can bodies to be tested below the surface of a liquid, a valve controlling admission of compressed fluid to the passages in member (a) and a system valve in series with the first-named valve, a shield movable up and down along the guide rails independently of the carriage movement and also during part of its travel being movable with the carriage, means operable by the independent movement of the shield to open the system valve when the shield is lowered to the limit of its independent movement.

7. A can body testing machine according to claim 1 which includes a carriage on which members (a) and (b) are mounted, said carriage being movable up and down along guide rails for alternate submersion of the can bodies to be tested below the surface of a liquid, a shield movable up and down along guide rails independently of the carriage movement and also during part of its travel being movable with the carriage, a valve controlling admission of compressed fluid to the passages in member (a), a system valve and an auxiliary valve both in series with the first-named valve, means operable by the independent movement of the shield to open the system valve when the shield is lowered to the limit of its independent movement, and means operable by the movement of the carriage to open the auxiliary valve upon submersion of the can bodies.

8. A can body testing machine comprising
 (a) a member adapted to extend into a can body having one end open and the other closed and an outwardly extending flange at the open end of the can, said member having a resilient sealing means to engage the inner sides of the can within the open end thereof,
 (b) clamping members shaped to fit the outside of the can body adjacent its open end and to engage said flange to hold the can body tightly in the region of said sealing means and to bear against the flange to both seal and lock the can against endwise movement.

9. A can body testing machine according to claim 8 which includes a second member (a) and in which members (b) comprise two pairs of clamping elements each having a semicircular clamping surface, the elements of each pair being separable to allow the mounting and removal of can bodies over and from the respective members (a) and within and from the members (b), and which further includes
 (c) a fixed mounting for one clamping element of each pair, the other clamping element of each pair being movable and the two members (a) also being movable, and
 (d) fluid pressure means for moving the movable clamping elements and a lost motion coupling between such elements and the members (a) whereby movement of the clamping elements to a predetermined extent causes movement of the members (a) to a lesser extent.

by virtue of all of which, actuation of the fluid pressure means will produce the aforesaid separation of the clamping elements of each pair and also move the members (a) to a central location between the separated elements to permit mounting and removal of can bodies having an outwardly extending flange at the open end thereof without interference between such flange and the clamping elements.

References Cited

UNITED STATES PATENTS

| | | | |
|---|---|---|---|
| 1,118,478 | 11/1914 | Dixon | 73—49.2 |
| 1,126,089 | 1/1915 | Rudolphi | 73—45.5 |
| 3,307,390 | 3/1967 | Behrens et al. | 73—45.2 |

S. CLEMENT SWISHER, *Acting Primary Examiner.*

JEFFREY NOLTON, *Assistant Examiner.*

U.S. Cl. X.R.

73—49.2, 49.8